United States Patent
Taniguchi et al.

[11] Patent Number: 5,922,479
[45] Date of Patent: Jul. 13, 1999

[54] BRAZING ALLOY AND COMPOSITE ASSEMBLY JOINED BY USING THE SAME

[75] Inventors: Masato Taniguchi; Osamu Suzuki, both of Nagoya, Japan

[73] Assignee: NGK Spark Plug Co., Ltd., Nagoya, Japan

[21] Appl. No.: 08/547,927

[22] Filed: Oct. 25, 1995

[30] Foreign Application Priority Data

Oct. 26, 1994 [JP] Japan .................................. 6-287290

[51] Int. Cl.$^6$ ................. F01L 1/14; C22C 5/08; B32B 15/01; B32B 15/04

[52] U.S. Cl. .............. 428/673; 428/627; 428/674; 420/502; 123/90.48

[58] Field of Search ................. 428/632, 627, 428/673, 674, 671; 148/127; 420/502, 503, 504, 501; 123/90.48, 90.51

[56] References Cited

U.S. PATENT DOCUMENTS

| | | | |
|---|---|---|---|
| Re. 34,819 | 1/1995 | Mizuhara | 420/508 |
| 2,037,446 | 4/1936 | Weiger | 200/166 |
| 2,953,844 | 9/1960 | Gebb et al. | 29/183.5 |
| 3,373,016 | 3/1968 | Roeder et al. | 75/173 |
| 3,455,663 | 7/1969 | Zdanuk | 29/198 |
| 3,591,370 | 7/1971 | Denereaz | 75/169 |
| 4,011,056 | 3/1977 | Steine et al. | 29/199 |
| 4,369,162 | 1/1983 | Wagner et al. | 420/503 |
| 4,411,864 | 10/1983 | Morikawa et al. | 420/587 |
| 4,591,535 | 5/1986 | Mizuhara | 428/627 |
| 4,643,875 | 2/1987 | Mizuhara | 420/502 |
| 4,667,871 | 5/1987 | Mizuhara | 228/122 |
| 4,749,594 | 6/1988 | Malikowski et al. | 427/190 |
| 4,842,955 | 6/1989 | Rabinkin | 428/606 |
| 4,971,759 | 11/1990 | Watanabe et al. | 420/502 |
| 5,067,369 | 11/1991 | Taniguchi | 74/567 |
| 5,073,085 | 12/1991 | Ito et al. | 415/216.1 |
| 5,076,863 | 12/1991 | Taniguti et al. | 148/127 |
| 5,168,841 | 12/1992 | Suzuki et al. | 123/90.48 |
| 5,253,418 | 10/1993 | Taniguchi et al. | 29/888.43 |
| 5,340,658 | 8/1994 | Komatsu et al. | 428/558 |
| 5,364,010 | 11/1994 | Mizuhara | 228/124.6 |
| 5,390,843 | 2/1995 | Ito et al. | 228/124.1 |
| 5,593,514 | 1/1997 | Giessen et al. | 148/403 |

FOREIGN PATENT DOCUMENTS

| | | |
|---|---|---|
| 61-034141 | 2/1986 | Japan . |
| 2-199073 | 8/1990 | Japan . |
| 2012610 | 5/1994 | Russian Federation . |
| 1208721 | 10/1970 | United Kingdom . |

*Primary Examiner*—John J. Zimmerman
*Assistant Examiner*—Michael LaVilla
*Attorney, Agent, or Firm*—Foley & Lardner

[57] ABSTRACT

A brazing alloy for joining a pair of members at least one of which is a metallic member, contains Ag, Cu, In and Ti, and further contains from 0.03 wt. % to 1.2 wt. % Ni. A composite assembly of members at least one of which is a metallic member aid which are joined with such a brazing alloy, is also provided.

11 Claims, 5 Drawing Sheets

INVENTION (EXAMPLE No.1)

COMPARATIVE EXAMPLE
(EXAMPLE No.11)

BRAZING ALLOY AND COMPOSITE ASSEMBLY JOINED BY USING THE SAME

BACKGROUND OF THE INVENTION

1. Field of the Invention

The present invention relates to a brazing alloy for joining a composite assembly made up of a pair of members at least one of which is a metallic member or one of which is a metallic member and the other is a ceramic member. Further, the present invention relates to a composite assembly such as a tappet for an internal combustion engine, which is joined by using a brazing alloy.

2. Description of the Prior Art

An active brazing alloy has heretofore been used for joining a ceramic member and a metallic member of a composite assembly. An example of such a composite assembly having been practically used, is a turbocharger rotor, ceramic tappet, etc. The active brazing alloy contains active metals such as Ti, Zr, etc. The active brazing alloy is used exclusively with a view to increasing the strength at the joint between the ceramic member and the metallic member. By the use of such an active brazing alloy, a reaction layer is formed between the brazing alloy and the ceramic member to firmly bond the same and thereby enable the ceramic member and the metallic member to be joined firmly.

Further, among active brazing alloys, low melting point brazing alloys (solidus point is from 600° C. to 750° C.) such as In—Cu—Ag—Ti brazing alloy are used for joining the members of a mechanical part assembly such as a sliding part for an automobile which is used at a low temperature, with a view to reducing the difference in shrinkage (thermal distortion) between the ceramic and metallic members due to the difference in thermal expansion coefficient therebetween. It has been developed a technique for directly brazing a $Si_3N_4$ ceramic member and a Ni—Cr—Mo (SNCM 630) metallic member with an In—Cu—Ag—Ti brazing alloy for thereby manufacturing a tappet, rocker arm, valve bridge, etc. as disclosed in Japanese Patent Provisional Publication No. 2-199073.

Further, high melting point brazing alloys (solidus point is 900° C. or higher) of active brazing alloys have also been practically used.

The composite assembly joined with a low melting point alloy of the above described prior art active brazing alloys, has a sufficient strength with respect to tensile stress, compression stress, torsional stress, etc. at the initial stage of usage.

However, when used as an actual article, the composite assembly joined with such a low melting brazing alloy cannot produce a sufficient strength since it is subjected to severe conditions such as thermal stress other than the above described simple stress due to the difference in thermal expansion between the members caused by variations of temperature and fatigue caused in an elongated period of usage.

For example, in the case of a tappet for an internal combustion engine, which has a ceramic member formed with a sliding surface for contact with a cam, the temperature at the joint between the ceramic member and the metallic member (engine tappet main body) increases up to about 200° C. due to the heat caused by the slide of the cam and the tappet relative to each other, the heating by the engine lube oil, etc. Such a temperature increase causes thermal stress due to the difference in thermal expansion between the ceramic member (e.g., $Si_3N_4$) and the metallic member. Further, the fatigue is caused in an elongated period of usage. As a result, in use of such a tappet, there may occur such a case in which deterioration in the joining of the ceramic member and the metallic member such as separation or detachment thereof is caused. In this connection, the strength of joining between the metallic member and the ceramic member depends on the wettability of the joining surface of the metallic member. However, there is a limit in improving the wettability and preventing the detachment or separation of the metallic member from the brazing alloy layer.

Further, by the brazing with a high melting point active brazing alloy, it may be possible to prevent the strength of the brazing alloy of itself from being lowered in response to increase of the temperature. However, it has been impossible to prevent separation of the metallic member from the brazing alloy layer due to the stress caused by the difference in thermal expansion between the metallic member and the ceramic member in use.

SUMMARY OF THE INVENTION

According to an aspect of the present invention, there is provided a brazing alloy for joining a pair of members at least one of which is a metallic member. The brazing alloy contains Ag, Cu, In and Ti, and further contains from 0.03 wt. % to 1.2 wt. % Ni. In the brazing alloy, it is desired that the content of Ag is in the range from 50 wt. % to 80 wt. %, the content of In is in the range from 5 wt. % to 20 wt. %, the content of is in the range from 0.5 wt. % to 3 wt. % and the content of Cu is in the range from 15 wt. % to 50 wt. %.

According to another aspect of the present invention, there is provided a brazing alloy for brazing a ceramic member and a metallic member. The brazing alloy contains Ag, Cu, In and Ti, and further contains from 0.03 wt. % to 1.2 wt. % Ni. It is desired that in the brazing alloy the content of Ag is in the range from 50 wt. % to 80 wt. %, the content of In is in the range from 5 wt. % to 20 wt. %, the content of Ti is in the range from 0.5 wt. % to 3 wt. % and the content of Cu is in the range from 15 wt. % to 50 wt. %. It is further desired that the ceramic member is made of silicon nitride.

According to a further aspect of the present invention, there is provided a composite assembly of a ceramic member and a metallic member which are joined by using a brazing alloy containing Ag, Cu, In and Ti, and further containing from 0.03 wt. % to 1.2 wt. % Ni. It is desired that in the brazing alloy the content of Ag is in the range from 50 wt. % to 80 wt. %, the content of In is in the range from 5 wt. % to 20 wt. %, the content of Ti is in the range from 0.5 wt. % to 3 wt. % and the content of Cu is in the range from 15 wt. % to 50 wt. %. It is further desired that the ceramic member is made of silicon nitride.

According to a further aspect of the present invention, there is provided a tappet having a metallic member constituting a main body and a ceramic member providing a sliding surface for contact with a cam, the metallic member and the ceramic member being joined by using a brazing alloy containing Ag, Cu, In and Ti, and further containing from 0.03 wt. % to 1.2 wt. % Ni. It is desired that in the brazing alloy the content of Ag is in the range from 50 wt. % to 80 wt. %, said In is in the range from 5 wt. % to 20 wt. %, the content of Ti is in the range from 0.5 wt. % to 3 wt. % and the content of Cu is in the range from 15 wt. % to 50 wt. %. It is further desired that the ceramic member is made of silicon nitride.

A metallic member for brazing with a brazing alloy of this invention can be made of a metal having a relatively large thermal expansion coefficient ($12\times10^{-6}/°$ C. on the average up to 500° C.) such as SNCM 630, SNCM 616, SKC 24, SNCM 815 or the like carbon steel or iron according to Japanese Industrial Standards.

On the other hand, a metallic member for brazing with a brazing alloy of this invention can be a metal having a relatively small thermal expansion coefficient ($5\times10^{-6}/°$ C. on the average up to 500° C.) such as incoloy, W, 42 alloy, Mo, Kovar.

As a ceramic member for brazing with a brazing alloy of this invention, which has a thermal expansion coefficient of $3\times10^{-6}/°$ C. as an average up to 500° C., there can be enumerated silicon nitride (thermal expansion coefficient is $2\times10^{-6}/°$ C. sialon ($2\times10^{-6}/°$ C.), aluminum nitride ($4.5\times10^{-6}/°$ C.), silicon carbide ($4.5\times10^{-6}/°$ C.), etc.

It is desirable that the content of Ag is in the range of from 50 wt. % to 80 wt. % and particularly from 55 wt. % to 75 wt. %. In the case where the content of Ag becomes lower than 50 wt. % or higher than 80 wt. %, the alloy constituting the brazing alloy and forming a joining layer is lowered in fluidity when in a molten state and the mechanical strength of the joining layer is lowered, so the content of Ag smaller than 50 wt. % or higher than 80 wt. % is undesirable.

It is desirable that the content of Cu is in the range from 15 wt. % to 50 wt. % and particularly from 25 wt. % to 40 wt. %. In the case where the content of Cu becomes lower than 25 wt. % or higher than 40 wt. %, the alloy constituting the brazing alloy and forming a joining layer is lowered in fluidity when in a molten state, thus making it difficult for the molten alloy to flow into the space at the joint between the joining members, and lowering the mechanical strength of the brazing alloy forming the joint layer. So, the content of Cu smaller than 25 wt. % or higher than 40 wt. % is undesirable.

It is desirable that the content of In is in the range from 5 wt. % to 20 wt. % and particularly from 10 wt. % to 15 wt. %. In the case where the content of In becomes lower than 5 wt. % or higher than 20 wt. %, the melting point becomes higher so that the fluidity of the brazing alloy of itself is lowered, so the content of In lower than 5 wt. % or higher than 20 wt. % is undesirable.

It is desirable that the content of Ti is in the range from 0.5 wt. % to 3 wt. % and particularly from 1 wt. % to 2 wt. %. In the case where the content of Ti becomes lower than 0.5 wt. % or higher than 3 wt. %, the joining strength is extremely lowered. So, the content of Ti lower than 0.5 wt. % or higher than 3 wt. % is undesirable.

In the case of the content of Ni is lower than 0.03 wt. % segregation of Cu is largely caused, whereas in the case where the Ni content is higher than 1.2 wt. % the fluidity of the brazing alloy in a molten state is deteriorated to disable the joining members to be joined correctly.

When a brazing alloy containing Ag, Cu, In and Ti is made to contain a predetermined amount of Ni, segregation of Cu in Ag matrix is inhibited, thus making it possible for the brazing alloy to have a metallographic structure of a quite good dispersion. As a result, in a composite assembly joined by such a brazing alloy, the hot strength or high temperature strength of the brazing alloy of itself at the joint of the composite assembly is increased.

Further, by the addition of Ni, the viscosity of the brazing alloy is increased. As a result, for the heating and loading (in the direction perpendicular to the joining surface of a joining member) at the time of joining, the brazing alloy of the composite assembly after joining is given a larger thickness as compared with the brazing alloy which does not contain such a predetermined amount of Ni. For this reason, the brazing alloy layer which is a little thicker as compared with that in the case of joining with a brazing alloy which does not contain the predetermined amount of Ni, serves as a buffer layer for mitigating the thermal stress caused by the difference of thermal expansion between the joining members. Accordingly, even in the case where a metallic member and a ceramic member are joined with a brazing alloy, separation is not caused between the metallic member and the brazing alloy. Further, even in the case where the metallic members of different thermal expansion coefficients are joined, separation is not caused between either of the metallic members and the brazing alloy.

It is accordingly an object of the present invention to provide a novel and improved brazing alloy for brazing a pair of members at least one of which is a metallic member, which can effectively prevent separation of the metallic member from an associated brazing alloy layer even when large thermal stress is caused due the difference in thermal expansion coefficient between the joining members.

It is a further object of the present invention to provide a composite assembly which is joined by using a brazing alloy of the above described character.

DETAILED DESCRIPTION OF THE INVENTION

A brazing metal or alloy is formed from predetermined raw materials through dissolution, degreasing, annealing, etc. and thereafter is formed into the shape of plate, bar, wire or the like by rolling, drawing, or the like.

The brazing alloy is interposed between a pair of members to be joined. The joining members are brazed whilst being subjected to a load perpendicular to the joining surfaces thereof and thereby holding the brazing alloy fittingly in contact therewith. In the meantime, by utilizing the weight of one of the members, loading by the use of an independent weight, or the like can be eliminated.

EXAMPLE 1

Basic Evaluation on Temperature

A ceramic member 3 is made of $Si_3N_4$ and in the form of a circular plate of 35 mm in diameter and 1.5 mm thick. The ceramic member 3 is obtained by adding an alumina yttria sintering additive and a binder to 90% silicon nitride powder, forming a compacted body of a circular plate shape from the powder, firing the compacted body in a nitrogen atmosphere and lapping an end surface of the fired body.

A metallic member 2 is 35 mm in diameter and 50 mm thick, and various metallic members made of various materials shown in Table 1 were prepared.

Various brazing alloys 1 having various compositions shown in Table 1 were prepared.

Figure 1:
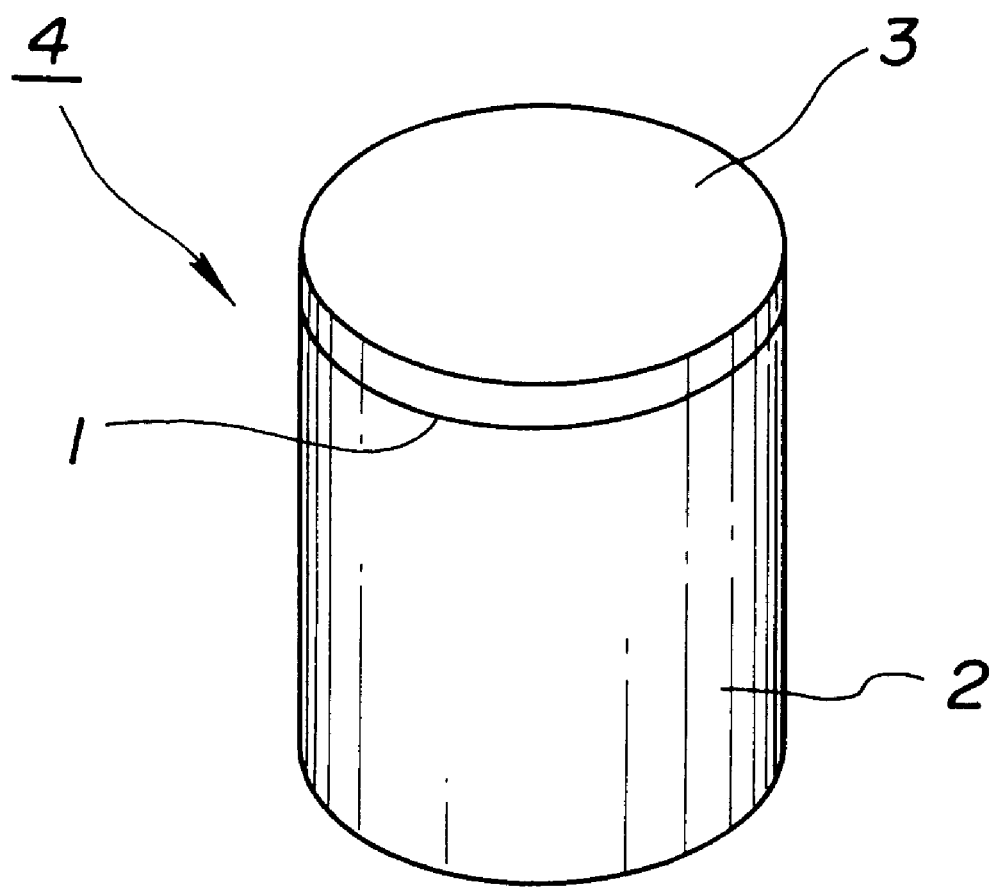
FIG. 1 is a perspective view of a composite assembly according to an embodiment of the present invention, which is joined by using a brazing alloy of this invention.

A brazed composite body 4 shown in FIG. 1 were obtained by first placing the brazing alloy 1 on the ceramic member 3, then the metallic member 2 thereon, further placing thereon a weight, holding them at 795° C. in vacuum for 30 min., cooling them in a furnace substituted by $N_2$ gas and thereby brazing the ceramic and metallic members to each other.

The result is shown in Table 1.

It took a longer time before the composite body brazed with a brazing alloy of this invention caused a predetermined percentage of separation as compared with the comparative example. This is due to the fact that a predetermined amount of Ni is contained in the brazing alloy so that the brazing alloy and the metallic member are joined so firmly as to sustain the thermal stress caused by the difference in thermal expansion coefficient between the joining members.

Figure 2A:
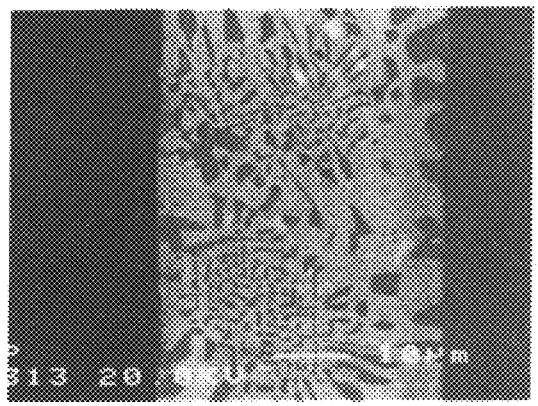
FIG. 2A is a photograph of a metallographic structure of a sectional surface of a brazing alloy of this invention, which is taken by using EPMA (electronic probe micro analyzer)
Figure 2B:
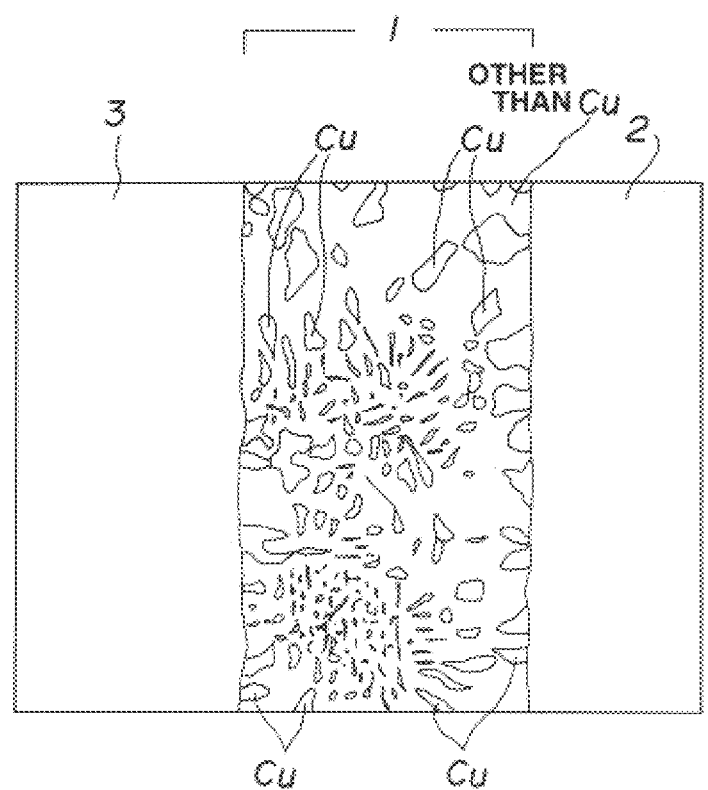
FIG. 2B is an illustration of the metallographic structure of FIG. 2A.
Figure 3A:
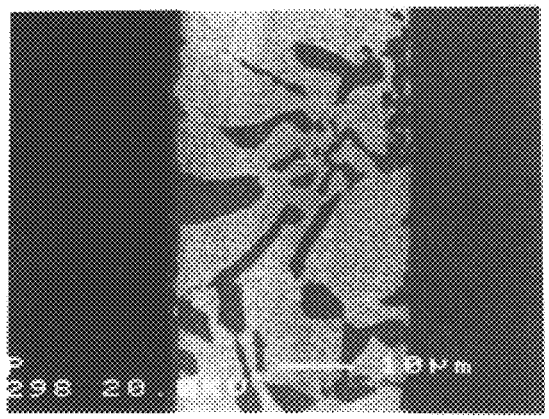
FIG. 3A is a view similar to FIG. 2A but shows a metallographic structure of a comparative example.
Figure 3B:
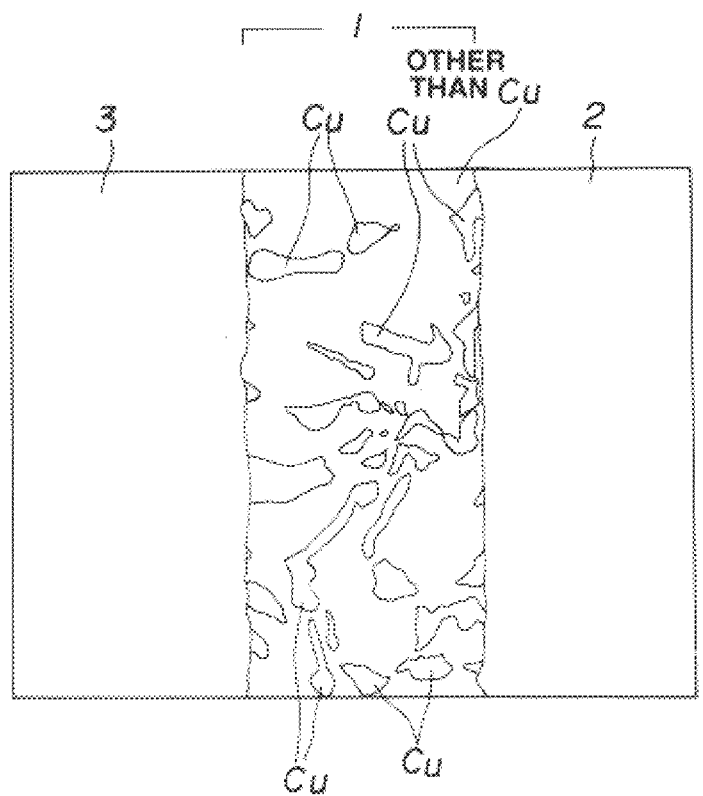
FIG. 3B is an illustration of the metallographic structure of FIG. 3A.

Further, as seen from FIGS. 2A and 2B, the metallographic structure of the brazing alloy of the example No. 1 and the metallographic structure (No. 3) of the brazing alloy of the comparative example No. 11 were observed. In the example of this invention, it was recognized that segregation of Cu was suppressed and the crystal became finer by the effect of a predetermined amount of Ni content. Further, the brazing alloy in the example of this invention after joining was thicker than that of the comparative example due to a higher viscosity.

TABLE 1

| *EXAMPLE NO. | METALLIC MEMBER | CREAMIC MEMBER | BRAZING METAL (wt. %) | | | | | *TIME (h) |
|---|---|---|---|---|---|---|---|---|
| | | | Ag | Cu | In | Ti | Ni | |
| 1 | SNCM 630 | $Si_3N_4$ | 60.16 | 27.91 | 10.06 | 1.38 | 0.49 | 100 |
| 2 | SNCM 616 | $Si_3N_4$ | 65.31 | 24.86 | 7.44 | 1.41 | 0.98 | 100 |
| 3 | SNCM 815 | $Si_3N_4$ | 59.10 | 27.25 | 12.53 | 0.87 | 0.25 | 100 |
| 4 | SKC 24 | $Si_3N_4$ | 67.01 | 26.52 | 4.97 | 1.45 | 0.05 | 100 |
| 5 | SNCM 630 | $Si_3N_4$ | 70.31 | 20.80 | 5.65 | 2.03 | 1.21 | 100 |
| 6 | SNCM 616 | $Si_3N_4$ | 54.26 | 29.67 | 15.21 | 0.83 | 0.03 | 100 |
| 7 | SNCM 815 | $Si_3N_4$ | 62.10 | 28.31 | 7.55 | 1.91 | 0.13 | 100 |
| 8 | SKC 24 | $Si_3N_4$ | 62.74 | 22.24 | 13.08 | 1.21 | 0.73 | 100 |
| 11 | SNCM 630 | $Si_3N_4$ | 60.06 | 28.51 | 10.02 | 1.41 | — | 4.1 |
| 12 | SNCM 616 | $Si_3N_4$ | 65.11 | 25.92 | 7.44 | 1.53 | — | 9.2 |
| 13 | SNCM 815 | $Si_3N_4$ | 58.90 | 27.56 | 12.53 | 1.01 | — | 6.5 |
| 14 | SKC 24 | $Si_3N_4$ | 66.97 | 26.52 | 5.01 | 1.49 | — | 12.4 |

*EXAMPLE NOS. 1 TO 8 INDICATE EXAMPLES OF THIS INVENTION. EXAMPLE NOS. 11 TO 14 INDICATE COMPARATIVE EXAMPLES. TIME (h) INDICATES THE NUMBER OF HOURS WHICH IT TOOK BEFORE A PREDETERMINED AMOUNT OF SEPARATION WAS CAUSED AND WHICH IS AN AVERAGE OF MEASUREMENT OF 10 EXAMPLES (HOWEVER, WITH RESPECT TO FROM NO. 1 TO NO. 8 EXAMPLES, A PREDETERMINED AMOUNT OF SEPARATION WAS NOT CAUSED EVEN AFTER LAPSE OF 100 HOURS, SO THE TEST WAS ENDED AFTER LAPSE OF 100 HOURS).

Ten examples of this invention and ten comparative examples were prepared and evaluation thereof were made by allowing them to stand in a furnace of 300° C.

The evaluation is made based on the time which it took before separation between the ceramic member 3 of $Si_3N_4$ (thermal expansion coefficient is about $2 \times 10^{-6}/°$ C.) and the metallic member 2 made of the material shown in Table 1 was caused due to the difference in thermal expansion coefficient therebetween.

The joining surfaces of the ceramic member and the metallic member are subjected to a shearing force directed in parallel thereto.

In this connection, separation of the ceramic member and the metallic member due to the difference in thermal expansion coefficient therebetween is liable to be caused at the joint between the metallic member and the brazing alloy layer than between the ceramic member and the brazing alloy layer. This is because the ceramic member and the brazing alloy layer are joined more firmly due to formation of reactants.

The time listed in Table 1 is the time which it took before a predetermined percentage of separation between the metallic member and the brazing alloy layer, i.e., separation at 50% of the total area of the joining surface was caused. Supersonic wave was used to measure how much percentage of the total area the separation is.

EXAMPLE 2

Actual Evaluation on Temperature and Load

Figure 4:
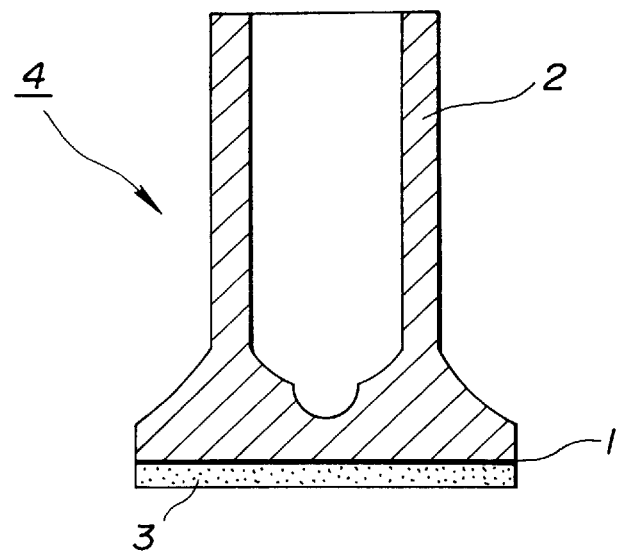
FIG. 4 is a longitudinal sectional view of a composite assembly (tappet) according to an embodiment of the present invention, which is joined with a brazing alloy of this invention.

A ceramic tappet 4 shown in FIG. 4 was obtained by holding an assembly of a ceramic member 3 which is a sintered body of $Si_3N_4$ and 40 mm in diameter and 2 mm thick and has ground opposite end surfaces, a metallic member 2 formed by forging and a brazing alloy 1 shown in Table 2 and interposed between the ceramic member 3 and the metallic member 2, at 800° C. in a vacuum furnace for 30 min. for thereby joining the ceramic member 3 and the metallic member 2 together. By this, the ceramic tappet 4 has a sliding surface formed by the ceramic member 3.

Figure 5:
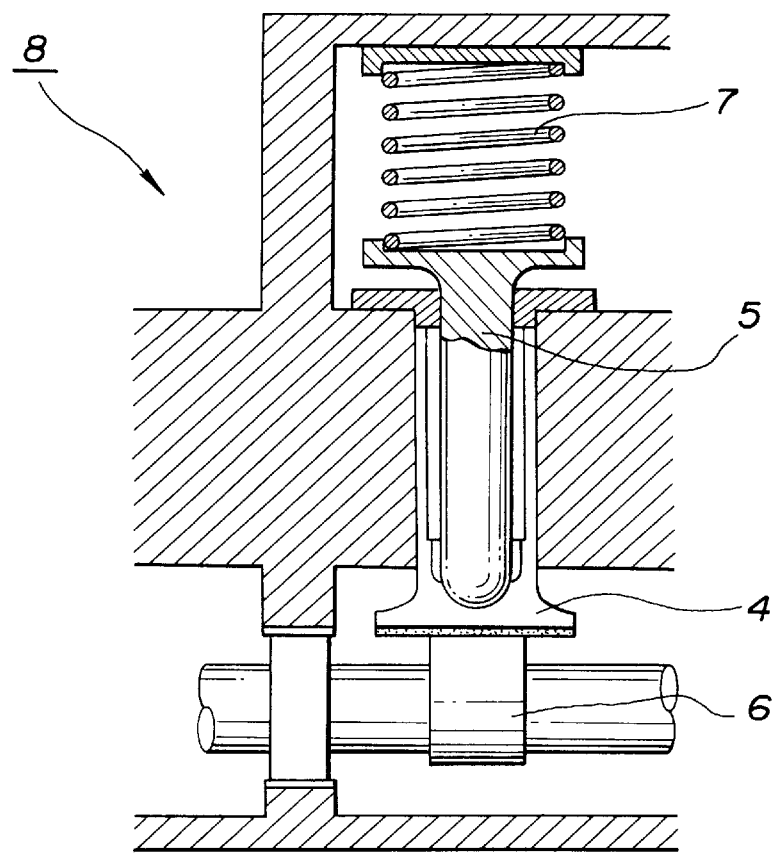
FIG. 5 is a schematic view of a cam motoring device.
Figure 6:
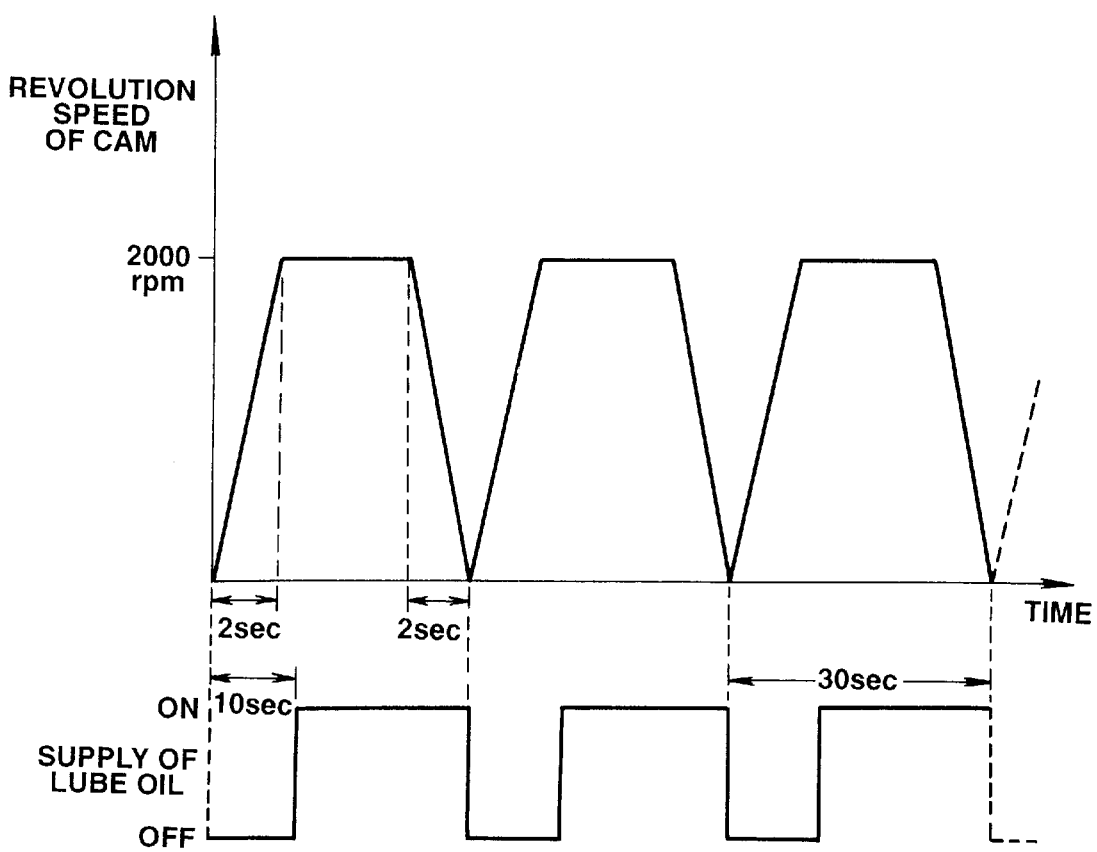
FIG. 6 is a chart illustrating a cycle of test of a tappet by using the cam motoring device of FIG. 5.

The tappet 4 was installed on a cam motoring device 8 shown in FIG. 5 and was subjected to a cyclic test in accordance with a chart shown in FIG. 6, that is, the tappet 4 is driven cyclically in accordance with the chart of FIG. 6. In FIG. 6 which shows only three cycles of test, "ON" indicates an operation mode where supply of lube oil to the tappet 4 and an associated cam is made and "OFF" indicates an operation mode where supply of lube oil to the tappet 4 and the cam is stopped. During the test according to this chart, in the case of an "OFF" mode where supply of lube oil to the cam and the tappet is stopped, the temperature at the brazed section of the tappet 4 became 200° C. or more due to the lack of lube oil.

The result is shown in Table 2.

TABLE 2

| *EXAMPLE NO. | METALLIC MEMBER | CERAMIC MEMBER | BRAZING METAL (wt. %) | | | | | *CYCLE |
|---|---|---|---|---|---|---|---|---|
| | | | Ag | Cu | In | Ti | Ni | |
| 1 | SNCM 630 | $Si_3N_4$ | 55.21 | 36.77 | 6.47 | 1.21 | 0.34 | 5000 |
| 2 | SNCM 616 | $Si_3N_4$ | 61.41 | 23.43 | 12.16 | 1.91 | 1.09 | 5000 |
| 3 | SNCM 815 | $Si_3N_4$ | 72.35 | 14.88 | 9.49 | 2.51 | 0.77 | 5000 |
| 4 | SNCM 630 | $Si_3N_4$ | 60.39 | 23.29 | 15.01 | 0.86 | 0.45 | 5000 |
| 5 | SNCM 616 | $Si_3N_4$ | 65.24 | 23.19 | 10.41 | 1.05 | 0.11 | 5000 |
| 11 | SNCM 630 | $Si_3N_4$ | 59.31 | 27.43 | 12.01 | 1.25 | — | 600 |
| 12 | SNCM 616 | $Si_3N_4$ | 60.24 | 28.51 | 10.25 | 1.00 | — | 400 |
| 13 | SNCM 815 | $Si_3N_4$ | 62.18 | 21.31 | 15.09 | 1.41 | 0.01 | 600 |
| 14 | SNCM 630 | $Si_3N_4$ | 67.15 | 22.22 | 9.41 | 1.21 | 0.01 | 800 |

*EXAMPLE NOS. 1 TO 5 INDICATE EXAMPLES OF THIS INVENTION. EXAMPLE NOS. 11 TO 14 INDICATE COMPARATIVE EXAMPLES. "CYCLE" INDICATES A NUMBER OF TEST CYCLES HAVING BEEN DONE WHEN A PREDETERMINED AMOUNT OF SEPARATION WAS CAUSED BETWEEN A METALLIC MEMBER AND A BRAZING METAL LAYER (HOWEVER WITH RESPECT TO FROM NO. 1 TO NO. 5 EXAMPLES, A PREDETERMINED AMOUNT OF SEPARATION WAS NOT CAUSED EVEN AFTER 5000 TEST CYCLES, SO THE TEST WAS ENDED AFTER 5000 TEST CYCLES).

As will be seen from Table 2, in all the examples of this invention (example Nos. 1 to 5), the above described predetermined amount of separation was not caused between a metallic member and a brazing alloy layer until 5,000 test cycles were made. In contrast to this, in either of the comparative examples (example Nos. 11 to 14), the above described predetermined amount of separation was caused when 800 or less test cycles were made. From this, it will be understood that the tappet produced by using the brazing alloy of this invention can adequately endure or sustain the thermal stress, fatigue, etc.

While the examples of this invention have been described and shown as above with respect to a composite assembly of a ceramic member and a metallic member, this is not for the purpose of limitation but the present invention may be applied to joining of metallic members or joining of a metallic member to another different material member. In the case of joining of metallic members, the present invention is particularly effective when the members are largely different in thermal expansion coefficient.

Further, an intermediate layer may be interposed between the joining members for mitigating the stress caused therebetween. In this connection, a brazing alloy, an intermediate layer and a brazing alloy are interposed in this order between the members to be joined. The intermediate layer is preferably a soft metal such as Cu, Ni, etc.

From the foregoing, it will be understood that by the brazing alloy of this invention it becomes possible to attain joining of a metallic member in such a manner that separation of the metallic member from a brazing alloy layer is not caused even when thermal stress is caused at the joint due to the difference in thermal expansion.

It will be further understood that a composite assembly of this invention does not cause separation of a metallic member from a brazing alloy even when thermal stress is caused at the joint due to the difference in thermal expansion coefficient between the joining members.

What is claimed is:

1. A brazing alloy for joining a pair of members at least one of which is a metallic member, wherein the brazing alloy consists essentially of Ag, Cu, In and Ti, and from 0.3 wt. % to 1.2 wt. % Ni, based on the total weight of the brazing alloy, and wherein the content of said Ag is in the range from 50 wt. % to 80 wt. %, the content of said In is in the range from 5 wt. % to 20 wt. %, the content of said Ti is in the range 0.5 wt. % to 3 wt. % and the content of said Cu is in the range from 15 wt. % to 50 wt. %.

2. A brazing alloy for joining a ceramic member to a metallic member, wherein the brazing alloy consists essentially of Ag, Cu, In and Ti, and from 0.3 wt. % to 1.2 wt. % Ni, based on the total weight of the brazing alloy, and wherein the content of said Ag is in the range from 50 wt. % to 80 wt. %, the content of said In is in the range from 5 wt. % to 20 wt. %, the content of said Ti is in the range from 0.5 wt. % to 3 wt. % and the content of said Cu is in the range from 15 wt. % to 50 wt. %.

3. A brazing alloy for brazing a ceramic member and a metallic member according to claim 2, wherein the ceramic member is made of silicon nitride.

4. A brazing alloy for joining a pair of members at least one of which is a metallic member, wherein the brazing alloy consists essentially of Ag, Cu, In and Ti, and from 0.3 wt. % to 1.2 wt. % Ni, based on the total weight of the brazing alloy, and wherein the content of said Ag is in the range from about 55 wt. % to about 75 wt. %, the content of said In is in the range from about 10 wt. % to about 15 wt. %, the content of said Ti is in the range from about 1 wt. % to about 2 wt. %, and the content of said Cu is in the range from about 25 wt. % to about 40 wt. %.

5. A brazing alloy for joining a ceramic member to a metallic member, wherein the brazing alloy consists essentially of Ag, Cu, In and Ti, and from 0.3 wt. % to 1.2 wt. % Ni, based on the total weight of the brazing alloy, and wherein the content of said Ag is in the range from about 55 wt. % to about 75 wt. %, the content of said In is in the range from about 10 wt. % to about 15 wt. %, the content of said Ti is in the range from about 1 wt. % to about 2 wt. %, and the content of said Cu is in the range from about 25 wt. % to about 40 wt. %.

6. A composite assembly of a ceramic member and a metallic member which are joined by using a brazing alloy consisting essentially of Ag, Cu, In and Ti, and from 0.3 wt. % to 1.2 wt. % Ni, based on the total weight of the brazing alloy, and wherein the content of said Ag is in the range from about 50 wt. % to about 80 wt. %, the content of said In is in the range from about 5 wt. % to about 20 wt. %, the content of said Ti is in the range from about 0.5 wt. % to about 3 wt. % and the content of said Cu is in the range from about 15 wt. % to about 50 wt. %.

7. A composite assembly according to claim 6, wherein said ceramic member is made of silicon nitride.

8. A composite assembly of a ceramic member and a metallic member which are joined by using a brazing alloy consisting essentially of Ag, Cu, In and Ti, and from 0.3 wt. % to 1.2 wt. % Ni, based on the total weight of the brazing alloy, and wherein the content of said Ag is in the range from about 55 wt. % to about 75 wt. %, the content of said In is in the range from about 10 wt. % to about 15 wt. %, the content of said Ti is in the range from about 1 wt. % to about 2 wt. %, and the content of said Cu is in the range from 25 wt. % to about 40 wt. %.

9. A tappet having a metallic member constituting a main body and a ceramic member providing a sliding surface for contact with a cam, the metallic member and the ceramic member being joined by using a brazing alloy consisting essentially of Ag, Cu, In and Ti, and from 0.3 wt. % to 1.2 wt. % Ni, based on the total weight of the brazing alloy, and wherein the content of said Ag is in the range from 50 wt. % to 80 wt. %, the content of said In is in the range from 5 wt. % to 20 wt. %, the content of said Ti is in the range from 0.5 wt. % to 3 wt. % and the content of said Cu is in the range from 15 wt. % to 50 wt. %.

10. A tappet according to claim 9, wherein said ceramic member is made of silicon nitride.

11. A tappet having a metallic member constituting a main body and a ceramic member providing a sliding surface for contact with a cam, the metallic member and the ceramic member being joined by using a brazing alloy consisting essentially of Ag, Cu, In and Ti, and from 0.3 wt. % to 1.2 wt. % Ni, based on the total weight of the brazing alloy, and wherein the content of said Ag is in the range from about 55 wt. % to about 75 wt. %, the content of said In is in the range from about 10 wt. % to about 15 wt. %, the content of said Ti is in the range from about 1 wt. % to about 2 wt. %, and the content of said Cu is in the range from 25 wt. % to about 40 wt. %.

* * * * *